United States Patent
Chung et al.

[11] Patent Number: 5,870,369
[45] Date of Patent: Feb. 9, 1999

[54] OBJECTIVE LENS DEVICE INCLUDING AN OBJECTIVE LENS AND A TRANSPARENT MEMBER HAVING TWO LIGHT CONTROL PORTIONS AND OPTICAL PICKUP USING THE OBJECTIVE LENS DEVICE

[75] Inventors: Chong-sam Chung, Seongnam; Chul-woo Lee; Pyong-yong Seong, both of Seoul, all of Rep. of Korea

[73] Assignee: Samsung Electronics Co., Ltd., Kyungki-do, Rep. of Korea

[21] Appl. No.: 799,928

[22] Filed: Feb. 13, 1997

[30] Foreign Application Priority Data

Apr. 30, 1996 [KR] Rep. of Korea ............... 1996 13918

[51] Int. Cl.6 ............................................. G11B 7/00
[52] U.S. Cl. ............... 369/112; 369/44.24; 369/118; 369/94
[58] Field of Search ............................ 369/118, 112, 369/84, 44.24

[56] References Cited

U.S. PATENT DOCUMENTS

| | | | |
|---|---|---|---|
| 4,460,990 | 7/1984 | Opheij | 369/112 |
| 5,072,437 | 12/1991 | Chjkuma | 369/118 |
| 5,231,624 | 7/1993 | Finegan | 369/116 |
| 5,657,305 | 8/1997 | Sasaki et al. | 369/110 |
| 5,665,957 | 9/1997 | Lee et al. | 369/118 |

FOREIGN PATENT DOCUMENTS

| | | | |
|---|---|---|---|
| 0 742 554 | 11/1996 | European Pat. Off. | G11B 7/135 |
| WO 97/08691 | 3/1997 | European Pat. Off. | G11B 7/18 |

*Primary Examiner*—Eddie P. Chan
*Assistant Examiner*—Kim-Kwok Chu
*Attorney, Agent, or Firm*—Sughrue, Mion, Zinn, Macpeak & Seas, PLLC

[57] ABSTRACT

An objective lens device having two light control surfaces and an optical pickup able to adopt disks having different thicknesses as a recording medium. The objective lens device includes an objective lens arranged along an optical path parallel to the disks, and first and second control portions formed in a light incident surface of the objective lens, a light emitting surface thereof, or an extra transparent member. Therefore, two disks having different thicknesses are compatible as a recording medium, and light interference occurring when using a thick disk can be decreased.

28 Claims, 15 Drawing Sheets

OBJECTIVE LENS DEVICE INCLUDING AN OBJECTIVE LENS AND A TRANSPARENT MEMBER HAVING TWO LIGHT CONTROL PORTIONS AND OPTICAL PICKUP USING THE OBJECTIVE LENS DEVICE

BACKGROUND OF THE INVENTION

The present invention relates to an objective lens device which can be applied to a plurality of optical disks having different thicknesses, and to an optical pickup adopting the same.

Generally, an optical pickup of a compact disk player (CDP), a digital video disk player (DVDP), etc., is used to record and reproduce information on and from a recording medium in a non-contact manner.

Preferably, the optical pickup adopted in the DVDP which enables high-density recording and reproduction is applied to a recording medium such as a digital video disk (DVD), a compact disk (CD) or a CD-ROM for compatibility.

However, the standard thickness of the DVD is different from that of the CD or CD-ROM due to an allowance in the inclination of the disk and the numerical aperture of an objective lens. That is, since the thickness of the DVD is different from that of the CD, a spherical aberration occurs when an optical pickup for a DVD is applied to the CD. In this case, sufficient light intensity for recording an information signal cannot be obtained or a reproduced signal is deteriorated by the spherical aberration.

In order to solve the above problems, an objective lens device and an optical pickup adopting the objective lens device are proposed as follows.

In an objective lens device proposed by the applicants of the present invention, light of a middle region between a near axis region in which the spherical aberration occurring around the central optical axis does not occur and a far axis region surrounding the near axis region is blocked, an optical spot having a small peripheral light is formed without interference of light in the middle region.

As shown in FIGS. 1 and 2, a light control device is provided for blocking or scattering a light 122 of an incident light 120, incident on the middle region between the near axis region and the far axis region. Referring to FIG. 1, the light control device includes a transparent member 110 having a light control layer 111 for blocking or scattering the light incident on the middle region. In FIG. 2, the light control device includes a light control hole 111' formed in an objective lens 100', for scattering the light 122 incident on the middle region.

The near axis region is a region around the central axis of the lens (optical path), where negligible spherical aberration exists without influence on the central rays of the incident light 121. The far axis region is a region which is farther from the optical path than the near axis region and in which a light 123 is incident, thereby affecting the central rays. Also, the middle region is a region between the near axis region and the far axis region.

FIG. 3 is a schematic diagram showing an example of an optical pickup adopting the objective lens device shown in FIG. 1.

The optical pickup adopts the transparent member 110 having the light control layer 111 which was described with reference to FIG. 1. Thus, light emitted from a light source 150 passes through a beam splitter 140 and is then collimated by a collimating lens 130 to be incident on an objective lens 100 parallel to an optical path. At this stage, the light 122 incident on the middle region is blocked by the light control layer 111 formed on the transparent member 110, so that only the lights incident on the near axis region and the far axis region, respectively, pass through the objective lens 100. The lights 121 and 123 are converged by the objective lens 100 to form an optical spot on an optical disk 10. Thus, the objective lens device is compatible for a plurality of disks 10 having different thicknesses, such as a CD and a DVD.

Then, the light is reflected from the optical disk 10 and received by a photodetector 170 via the objective lens 100, the collimating lens 130 and the beam splitter 140. The photodetector 170 is composed of at least four divided plates which convert the received light into an electrical signal to be used as an error signal or information signal. At this stage, a condensing lens 160 is disposed between the beam splitter 140 and the photodetector 170.

FIG. 4 is a schematic diagram showing an example of the optical pickup adopting the objective lens device shown in FIG. 2.

The optical pickup adopts an objective lens 100' having a light control hole 111' for scattering the light 122 incident on the middle region. In this case, the elements designated by the same reference numerals as those of FIG. 3 and which are not described represent the same elements as those illustrated with reference to FIG. 3.

FIG. 5 is a graph showing an initial focus error of the optical pickup adopting a CD as a recording medium. The optical pickup includes an objective lens having a numerical aperture of 0.6 and a diameter of 4.04 mm, and the objective lens has an annular light control hole having an inner diameter of 1.2 mm and a width of 0.15 mm.

In FIG. 5, the X-axis represents the degree of defocus and the Y-axis represents a detected voltage value as an index of the degree of error.

Also in FIG. 5, there are two portions A and B, where the detected voltage values are zero. The portion A occurs when the optical pickup is placed in an "on focus" position to control an initial focus position. On the contrary, the portion B is occurs due to the spherical aberration caused by the difference in thickness of the recording media, and a waveform near the portion B, including the portion B, is defined as a parasitic waveform. The parasitic waveform exists because the focusing point of the beam which passed the far axis region is formed over a broad region by the spherical aberration of the objective lens.

When the parasitic waveform exists, the portion B may be considered as the "on focus" position due to the mechanical vibration of the recording medium.

SUMMARY OF THE INVENTION

To overcome the above problem, it is an object of the present invention to provide an objective lens device which enables a more accurate detection of an initial focus error signal by reducing the size of a parasitic waveform caused by a spherical aberration, and an optical pickup adopting the objective lens device.

To achieve the above object, there is provided an objective lens device comprising:

an objective lens, arranged at a position along an optical path of a light incident on a recording medium, for converging the incident light to form an optical spot on a recording surface of the recording medium; and a transparent member arranged at a position along the optical path; being separated from the objective lens, and having a first light control portion for blocking at least a portion of the light passing through the objective lens, and a second light control portion for blocking a portion of the light passing through a far axis region of the objective lens, the transparent member transmitting light which is incident on a remaining region thereof other than the first and second light control portions.

Also, there is provided an objective lens device comprising:

an objective lens, arranged along an optical path of a light which is incident on a recording medium, for converging the incident light to form an optical spot on a recording surface of the recording medium;

a first light control portion formed on at least one side of the objective lens, for one of blocking and scattering one of at least a portion of the light which is incident on a middle region of the objective lens and at least a portion of the light passing through the middle region; and a second light control portion formed on at least one side of the objective lens, for one of blocking and scattering one of at least a portion of the light incident on a far axis region of the objective lens and at least a portion of the light passing through the far axis region.

To achieve the above object, there is provided an optical pickup comprising:

a light source for irradiating a light along an optical path;

optical path converting means for diverting an incident light;

an objective lens, arranged along the optical path between the optical path converting means and a recording medium, for converging the incident light to form an optical spot on the recording medium;

a photodetector for receiving a light which has passed through the objective lens and the optical path converting means after being reflected from the recording medium to detect an error signal and an information signal; and a transparent member arranged along the optical path; being separated from the objective lens, having a first light control portion for blocking at least a portion of the light passing through a middle region of the objective lens, and a second light control portion for blocking part of the light passing through a far axis region of the objective lens, the transparent member transmitting light which is incident on a remaining region thereof other than the first and second light control portions.

Also, there is provided an optical pickup comprising:

a light source for irradiating a light along an optical path;

optical path converting means for diverting an incident light;

an objective lens, arranged along the optical path between the optical path converting means and a recording medium, for converging the incident light to form an optical spot on the recording medium;

a first light control portion formed on at least one side of the objective lens for controlling the light of a middle region of the objective lens;

a second light control portion formed on at least one side of the objective lens for controlling a portion of the light incident on a far axis region of the objective lens; and a photodetector for receiving a light which has passed through the objective lens and the optical path converting means after being reflected from the recording medium to detect an error signal and an information signal.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE INVENTION

Figure 6:
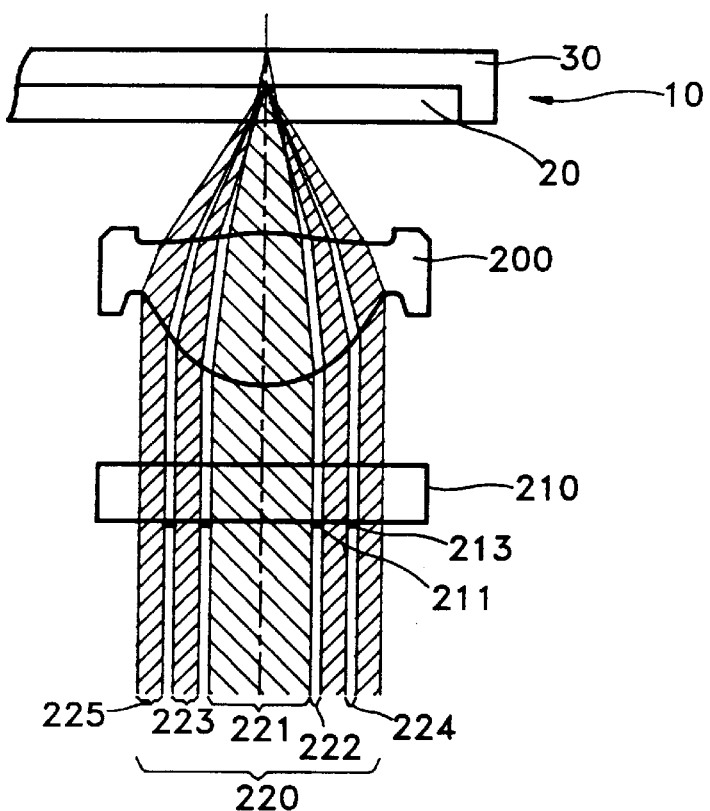
FIG. 6 is a diagram showing the optical arrangement of an objective lens device according to a preferred embodiment of the present invention.

As shown in FIG. 6, an objective lens device according to a preferred embodiment of the present invention includes an objective lens 200 placed on an optical path of light which is incident on a recording medium 10 and a transparent member 210 placed in the optical path of light and separated from the objective lens 200.

The objective lens 200 focuses an incident light 220 to form an optical spot on a recording surface of the recording medium 10. A spherical aberration of the objective lens 200 is used for the objective lens device to be compatible for the recording medium including disks 20 and 30 each having a different thickness. To this end, the light 222 incident on the middle region of the objective lens 200 is blocked or scattered. Lights 223 and 225 incident on the far axis region of the objective lens 200 are used when the thin disk 20 such as a DVD is used as a recording medium. Also, light 221 incident on the near axis region of the objective lens 200 is used when the relatively thick disk 30 such as a CD or the thin disk 20 is used as a recording medium.

The transparent member 210 has a first light control surface 211 for blocking the light 222 passing through the middle region of the objective lens 200, and a second light control surface 213 for partially blocking the light passing through the far axis region, that is, light 224. The light incident on a region other than the first and second light control surfaces 211 and 213 passes through the transparent member 210.

The first and second light control surfaces 211 and 213 are formed by depositing a reflective coating or a blocking layer on a predetermined portion of at least one surface of the transparent member 210. The first and second light control surfaces 211 and 213 preferably have an annular shape; however, they may have a circular, triangular, rectangular or some other polygonal shape.

Figure 7:
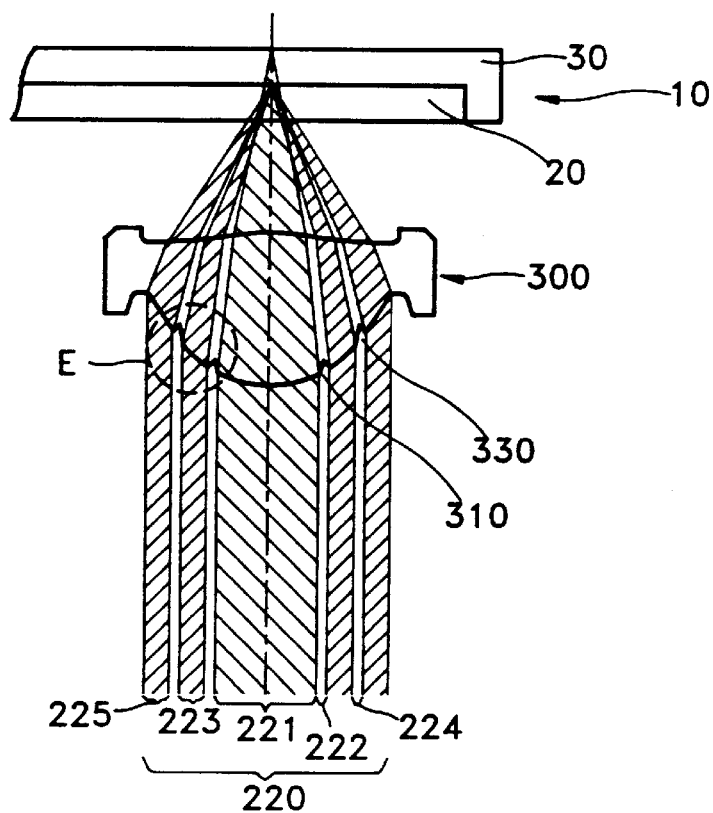
FIG. 7 is a diagram showing the optical arrangement of an objective lens device according to another preferred embodiment of the present invention.

FIG. 7 is a view illustrating an objective lens device according to another preferred embodiment of the present invention.

The objective lens device includes an objective lens 300 having a first light control portion 310 and a second light control portion 330 which are formed in the light incident surface of the objective lens 300, that is, a surface of the objective lens opposite to the recording medium.

The first light control portion 310 blocks or scatters at least part of light 222 incident on the middle region of the objective lens 300, and the second light control portion 330 partially blocks or scatters the light incident on the far axis region of the objective lens 300, that is, the light 224. Actually, the first light control portion 310 and the second light control portion 330 may be formed to have the same shape.

Figure 8:
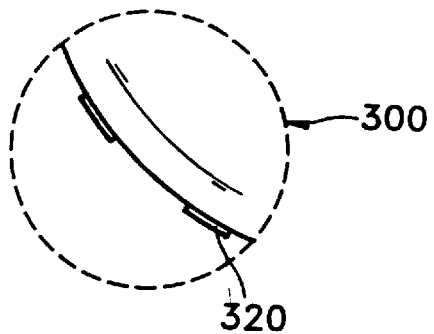
FIGS. 8, 9, 10, 11 and 12 are enlargements of the portion designated as E of an objective lens shown in FIG. 7 for illustrating various modified examples of first and second light control surfaces of the objective lens shown in FIG. 7.

FIG. 8 is an diagram showing the enlarged portion E of the objective lens 300. As shown in FIG. 8, the first and second light control portions 310 and 330 may be a reflective member 320 such as a reflective coating or a mirror for reflecting the incident beam.

Also, the first and second light control portions 310 and 330 may be a light control pattern for scattering or deflecting the incident light.

Modified examples of the light control pattern will be described with reference to FIGS. 9 to 12.

Figure 9:
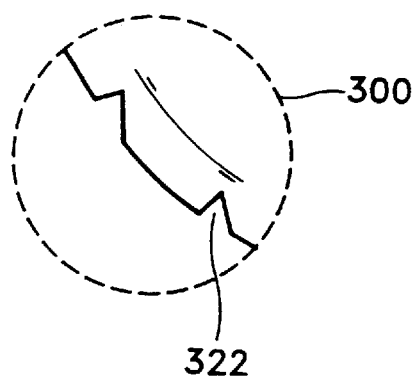
Figure 10:
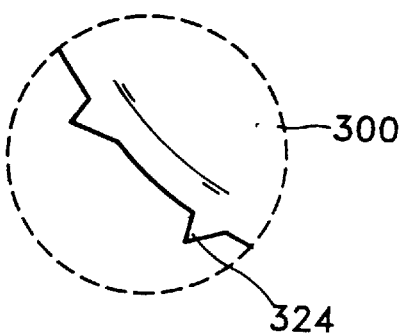
Figure 11:
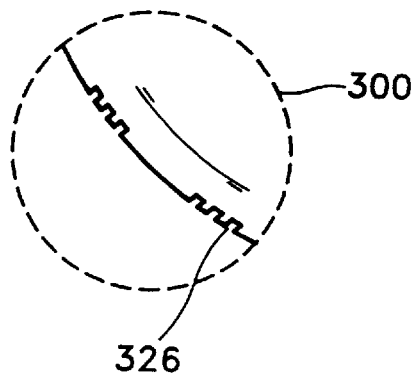
Figure 12:
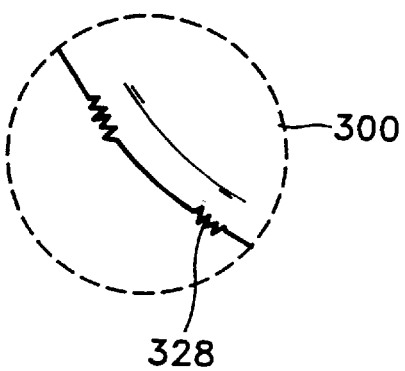

As shown in FIGS. 7 and 9, the light control pattern is formed as a notch-type hole 322 by which the light incident thereon is scattered or reflected. As shown in FIG. 10, the light control pattern may be formed as a protruded wedge shape 324 and a protruded staircase shape (not shown). Also, as shown in FIG. 11, the light control pattern may be a toothed portion 326 for scattering or reflecting the incident light. Also, as shown in FIG. 12, the light control pattern may be a fine sawtooth pattern 328 for scattering the incident light.

Preferably, the first and second light control portions 310 and 330 have an annular shape, and may have a circular, triangular, rectangular or some other polygonal shape.

If the first and second light control portions 310 and 330 have an annular shape, the positions of the first and second light control portions 310 and 330 may be defined by a numerical aperture (NA) since NA is defined as NA=n sin θ=n significant diameter/2·focal distance, wherein n is a refractive index of the medium.

For example, when adopting an objective lens having an NA of 0.6, the first light control portion 310 is preferably located at a position where the inner and outer diameters thereof correspond to portions having NAs of 0.37 and 0.4, respectively. Also, the second light control portion 330 is preferably located at a position where the inner and outer diameters thereof correspond to portions having NAs of 0.44 and 0.46, respectively.

Figure 13:
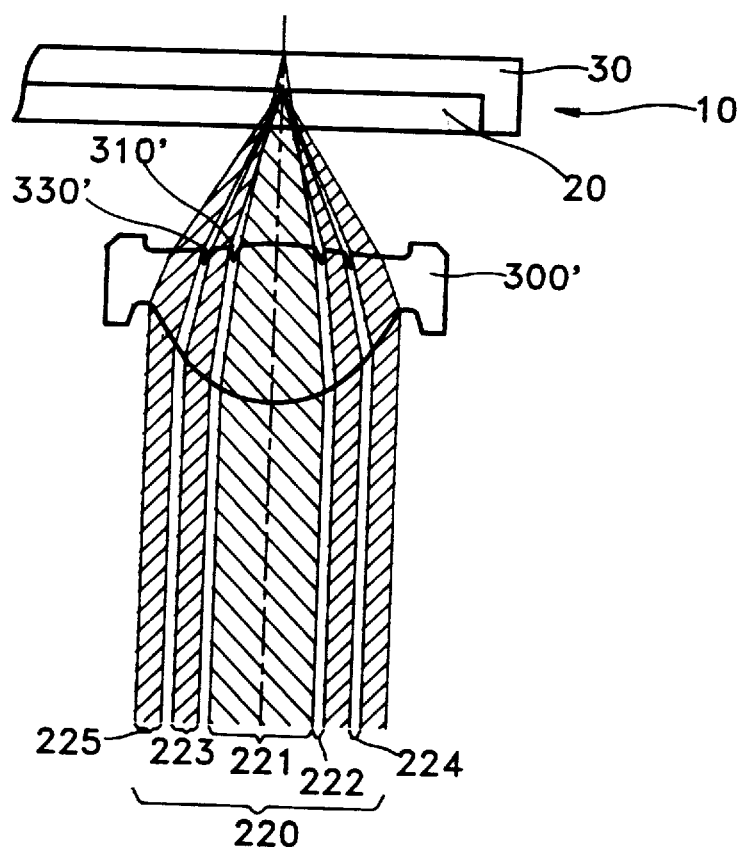
FIG. 13 is a diagram showing the optical arrangement of an objective lens device according to still another preferred embodiment of the present invention.

FIG. 13 is a diagram illustrating the objective lens device according to still another preferred embodiment of the present invention.

As shown in FIG. 13, a first light control portion 310' and a second light control portion 330' are formed in the surface of an objective lens 300', facing the recording medium 10. The first and second light control portions 310' and 330' may have the same structures as the first and second light control portions 310 and 330 described with reference to FIGS. 7 to 12. However, the locations and radii of each light control portion are different from those of FIGS. 7 to 12.

Also, the first and second light control portions may be formed in both surfaces of the objective lens, wherein the light control portions are located in the same optical path. In this case, the radii of the first and second light control portions formed on the surface facing the recording medium 10 are smaller than those formed on the other surface of the objective lens.

Meanwhile, a convex lens is used as the objective lens in the above embodiments; however, the convex lens may be replaced by a flat lens such as a hologram lens or a Fresnel lens based on a diffraction theory. The diffraction theory is well known; therefore, a description thereof will be omitted.

In the above-described objective lens device, light incident on the middle and far axis regions is partially blocked or scattered by the spherical aberration, thereby sharply reducing the size of a parasitic waveform.

Figure 14:
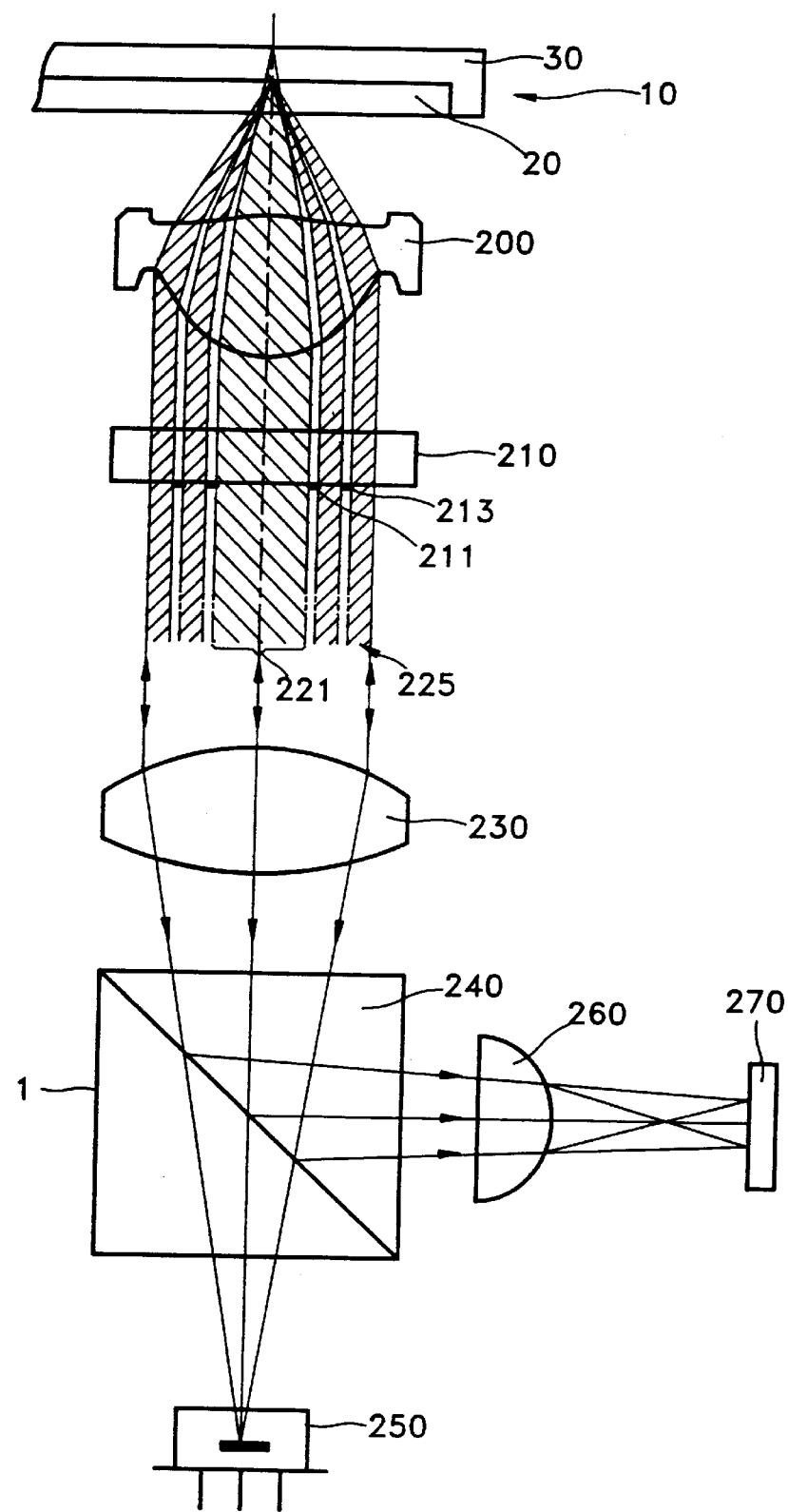
FIG. 14 is a diagram showing the optical arrangement of an optical pickup adopting the objective lens device shown in FIG. 6 according to the present invention.

FIG. 14 is a diagram illustrating an optical pickup adopting the objective lens device shown in FIG. 6 according to the present invention.

The optical pickup includes a light source 250, an optical path converting means 240, an objective lens device and a photodetector 270.

The light source 250 emits a laser beam having a predetermined wavelength. Preferably, a small semiconductor laser is adopted as the light source 250.

The optical path converting means 240 diverts the light by transmitting and/or reflecting the incident light. That is, the optical path converting means 240 transmits the light emitted from the light source 250 toward a recording medium 10 and reflects the light reflected from the recording medium 10 toward the photodetector 270. The optical path converting means 240 may be a half mirror or a polarization beam splitter for transmitting only a polarized beam. Also, a hologram optical element (HOE, not shown) having a predetermined diffraction pattern may be adopted.

The objective lens device is located in the optical path between the optical path converting means 240 and the recording medium 10 as described with reference to FIG. 6, and includes an objective lens 200 for converging the light emitted toward the recording medium 10 and a transparent member 210 having a first light control layer 211 and a second light control layer 213 which partially block the light emitted toward the objective lens 200.

The photodetector 270 receives the light via the objective lens 200 and the optical path converting means 240 after it is reflected from the recording medium 10 so as to detect a focusing error signal, a tracking error signal and an information signal (radio frequency signal) from the recording medium 10.

Preferably, the optical pickup further includes a collimating lens 230 formed in the optical path between the light source 250 and the objective lens 200 for collimating the incident light. Accordingly, the light incident on the objective lens 200 is maintained parallel. Also, the optical pickup may further include an astigmatism lens 260 in the optical path between the optical path converting means 240 and the photodetector 270.

Figure 15:
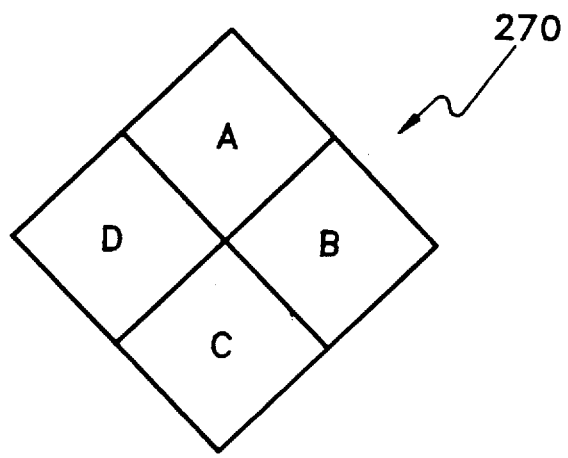
FIG. 15 is a diagram showing a preferred embodiment of the photodetector shown in FIG. 14.

Preferably, the photodetector 270 is composed of four divided plates A, B, C and D as shown in FIG. 15 in order to detect a focusing error signal according to an astigmatism method.

Figure 16:
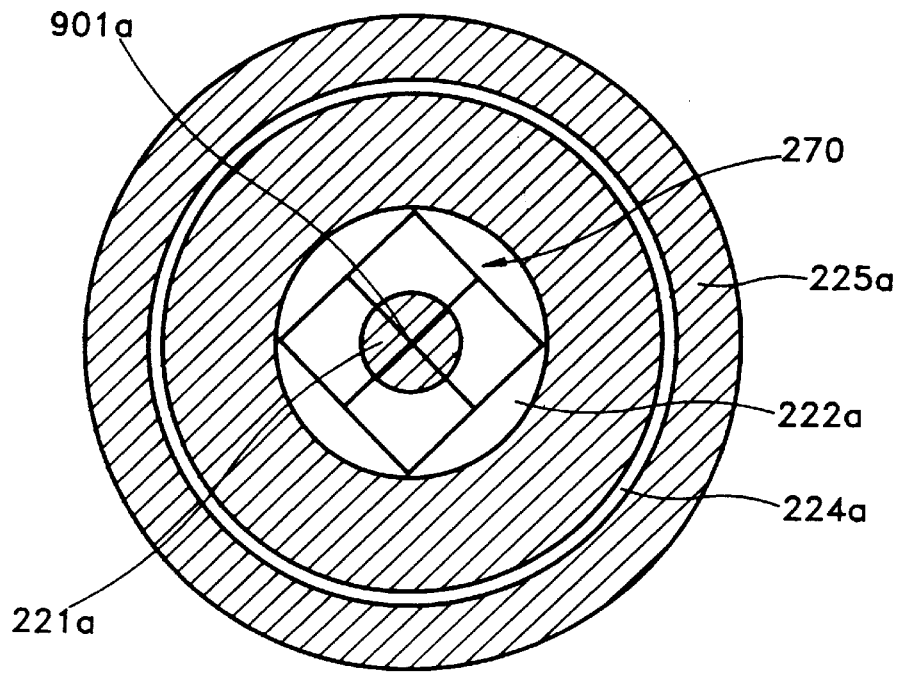
FIG. 16 is a diagram showing the distribution of light received by the photodetector shown in FIG. 15 when a relatively thick disk is adopted as a recording medium.
Figure 17:
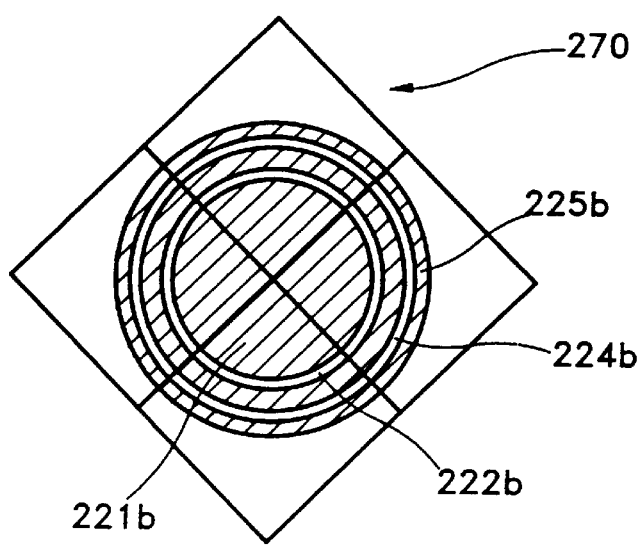
FIG. 17 is a diagram showing the distribution of light received by the photodetector shown in FIG. 15 when a relatively thin disk is adopted as a recording medium.

In this case, a spot formed in the center of the photodetector 270 has center portions 221a and 221b which correspond to the light 221 (see FIG. 14) incident on the near axis region and peripheral portions 225a and 225b which correspond to the light 225 (see FIG. 14) incident on the far axis region as shown in FIGS. 16 and 17.

FIG. 16 is a diagram showing the distribution of light during an "on-focus" state when a relatively thick disk is adopted as a recording medium, and FIG. 17 is a diagram showing the distribution of light during an "on-focus" state when a relatively thin disk such as a DVD is adopted as a recording medium. Comparing FIG. 16 with FIG. 17, the diameters of the central portions 221a and 221b which correspond to the light of the near axis region are scarcely changed. However, the diameters of the peripheral portions 225a and 225b corresponding to the light of the far axis region, and the diameters of portions 222a and 222b which are blocked by the first light control layer 211 and the diameters of portions 224a and 224b which are blocked by the second light control layer 213 are remarkably changed.

Referring to FIG. 16, the central portion 221a reaches the center of the photodetector 270, and the peripheral portion 225a encloses the periphery of the photodetector 270. Meanwhile, referring to FIG. 17, the central portion 221b reaches the center of the photodetector 270, and the peripheral portion 225b also exists in the photodetector, enclosing the center portion 221b.

Figure 18:
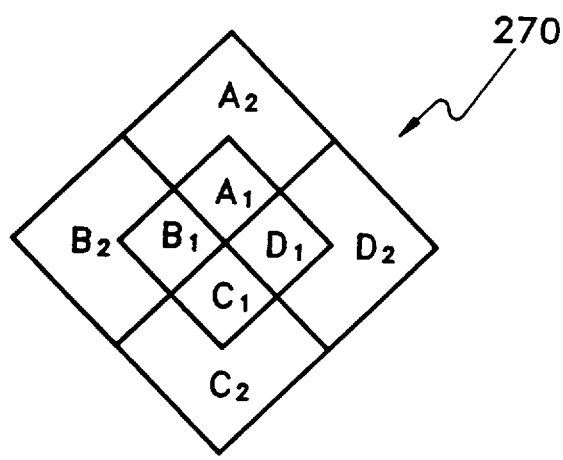
FIG. 18 is a diagram showing another preferred embodiment of the photodetector shown in FIG. 14.

Also, the photodetector 270 may be composed of four divided rectangular plates $A_1$, $B_1$, $C_1$ and $D_1$, and four divided L-shaped plates $A_2$, $B_2$, $C_2$ and $D_2$ as shown in FIG. 18.

Figure 19:
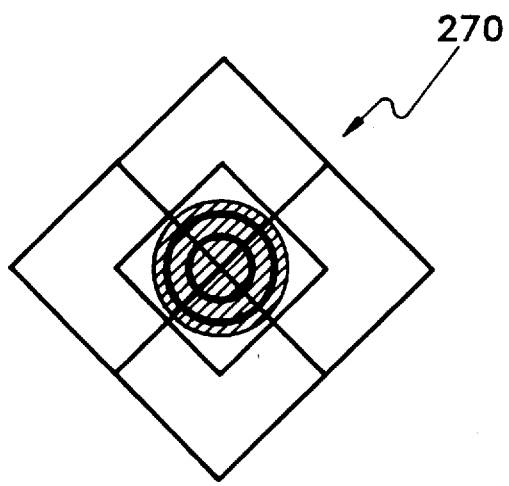
FIGS. 19, 20 and 21 are diagrams showing the distribution of light received by the photodetector shown in FIG. 18 when a relatively thin disk is adopted as a recording medium.
Figure 20:
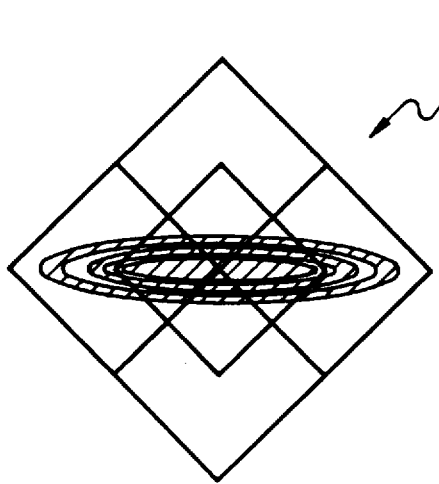
Figure 21:
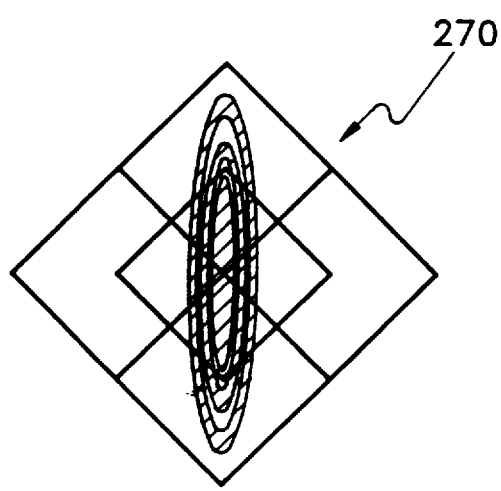
Figure 22:
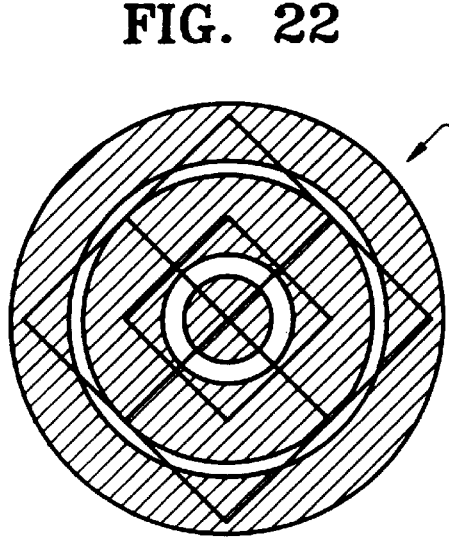
FIGS. 22, 23 and 24 are diagrams showing the distribution of light received by the photodetector shown in FIG. 18 when a relatively thick disk is adopted as a recording medium.
Figure 23:
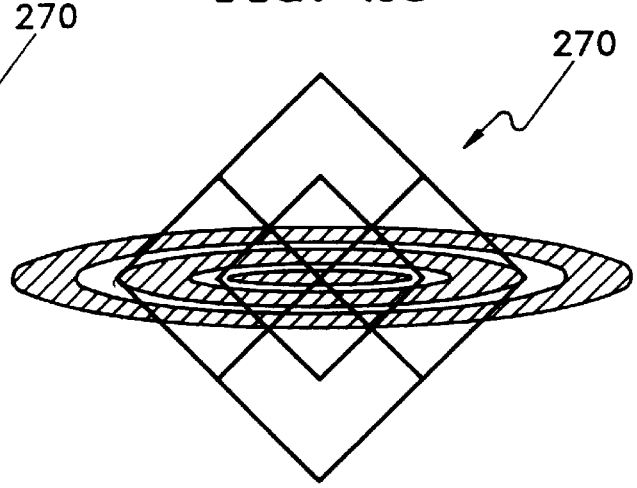
Figure 24:
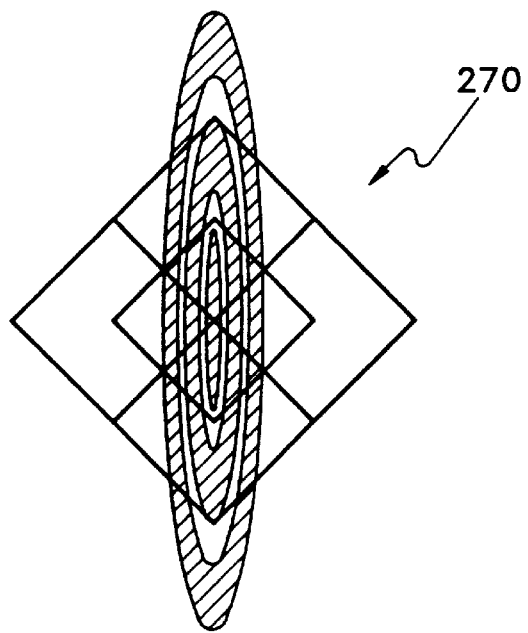

FIGS. 19 to 21 show the distribution of light received by the photodetector when a relatively thin disk is adopted as a recording medium, and FIGS. 22 to 24 show the distribution of light received by the photodetector when a relatively thick disk is adopted as a recording medium.

The divided rectangular divided plates $A_1$, $B_1$, $C_1$ and $D_1$ are designed to have a predetermined size so as to receive the maximum amount of light from the near axis region when reading information from a relatively thick disk and to receive the minimum amount of light from the far axis region, and so as to receive light from both the near axis region maintaining a predetermined size and the minimized far axis region. Also, when reading information from the relatively thick disk, the light of the far axis region reaches the L-shaped divided plates $A_2$, $B_2$, $C_2$ and $D_2$ as shown in FIG. 22.

FIGS. 19 to 21 show the distribution of light received by the photodetector when a relatively thin disk is adopted as a recording medium. In detail, FIG. 19 represents the case where the objective lens device is in the "on-focus" state, FIG. 20 represents the case where the objective lens device is far from the thin disk, and FIG. 21 represents the case where the objective lens device is near the thin disk, respectively.

Also, FIGS. 22 to 24 are diagrams showing the distribution of light received by the photodetector when a relatively thick disk is adopted as a recording medium. In detail, FIG. 22 represents the case where the objective lens device is in the "on-focus" state, FIG. 23 represents the case where the objective lens device is far from the thick disk, and FIG. 24 represents the case where the objective lens device is near the thick disk, respectively.

The photodetector having the above structure uses all signals which pass through the divided rectangular plates $A_1$, $B_1$, $C_1$ and $D_1$, and the divided L-shaped plates $A_2$, $B_2$, $C_2$ and $D_2$ when reading information from a thick disk, and uses only the signal which passes through the divided rectangular plates $A_1$, $B_1$, $C_1$ and $D_1$ when reading information from a thin disk.

Figure 1:
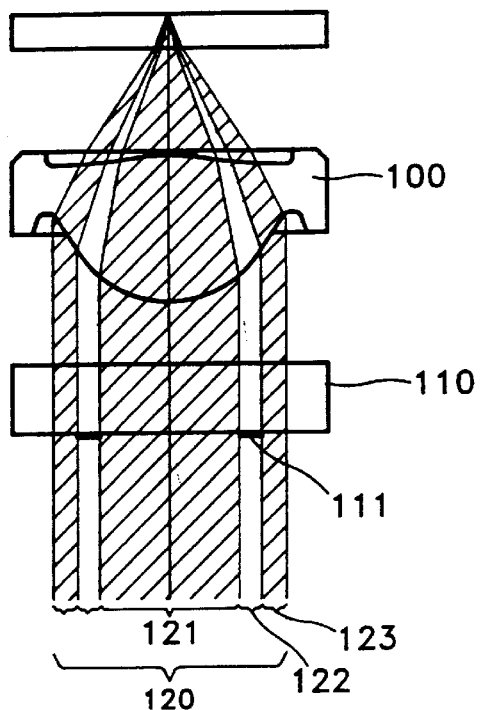
FIG. 1 is a diagram showing a preferred embodiment of the optical arrangement of an objective lens device suggested by the applicants of the present invention.
Figure 2:
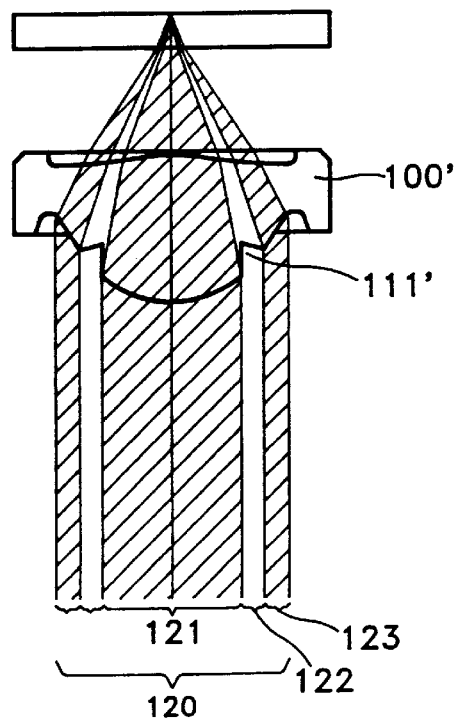
FIG. 2 is a diagram showing another preferred embodiment of the optical arrangement of the objective lens device suggested by the applicants.
Figure 3:
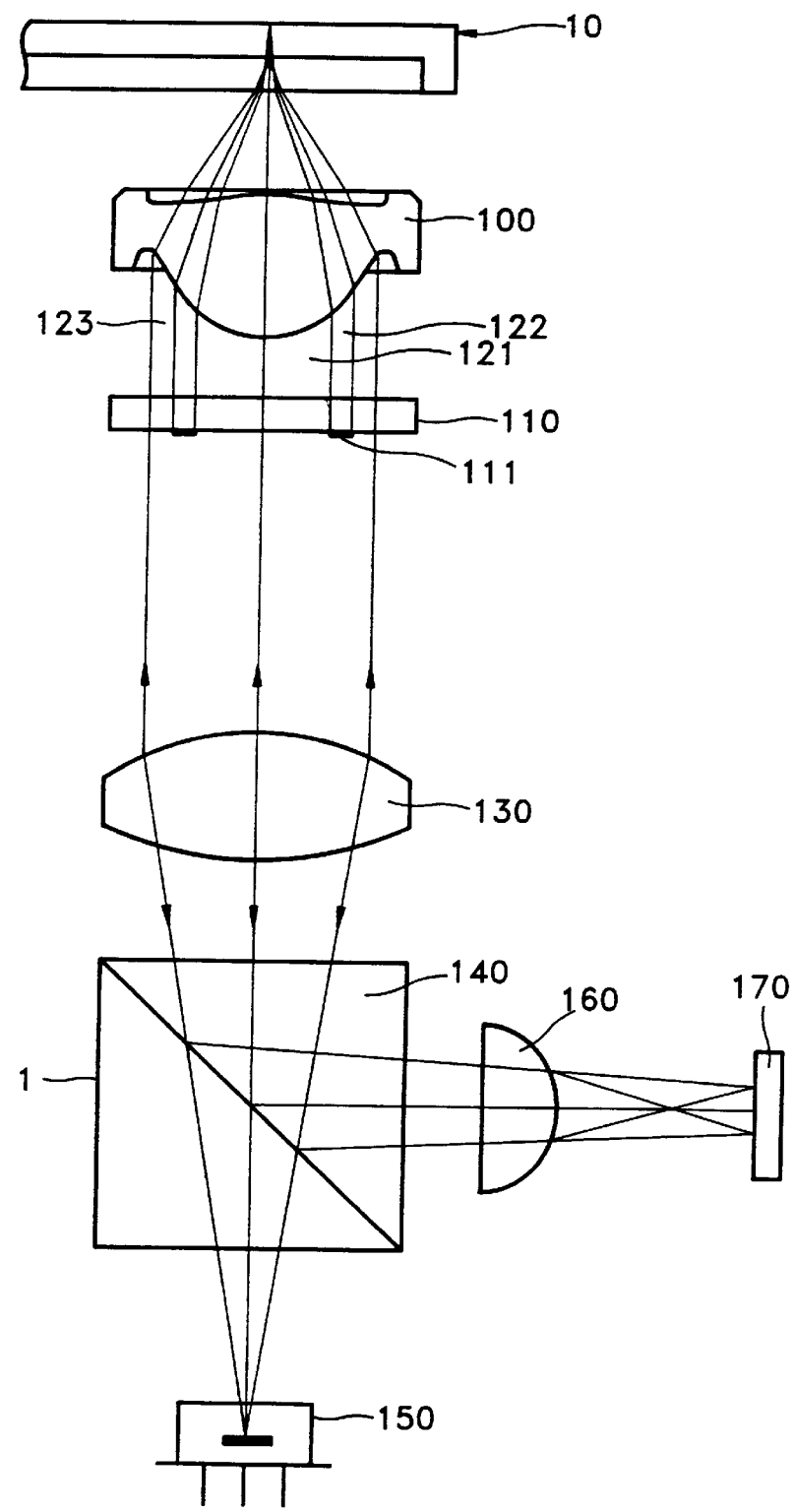
FIG. 3 is a diagram showing the optical arrangement of an optical pickup device adopting the objective lens device shown in FIG. 1.
Figure 4:
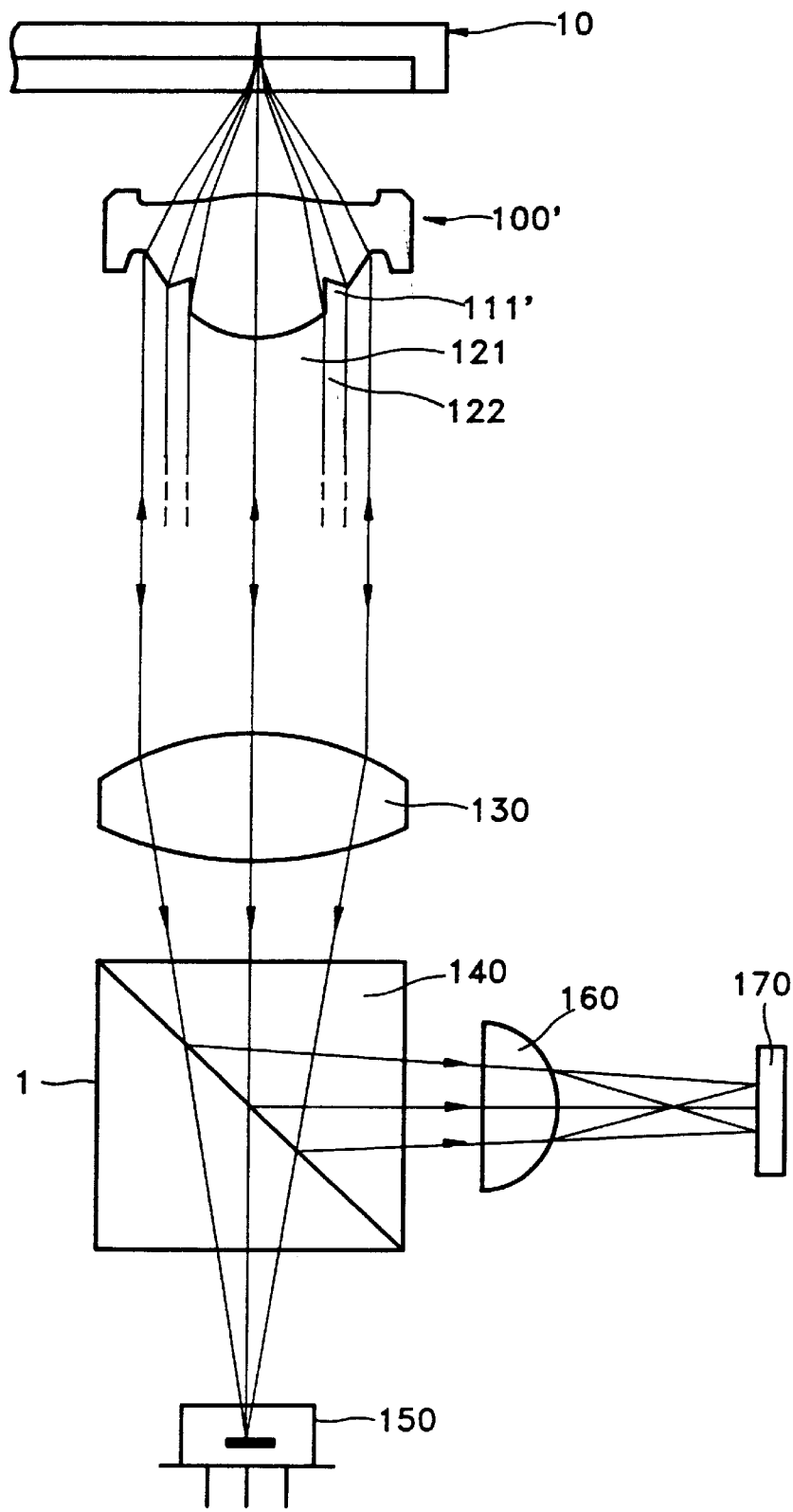
FIG. 4 is a diagram showing the optical arrangement of an optical pickup device adopting the objective lens device shown in FIG. 2.
Figure 5:
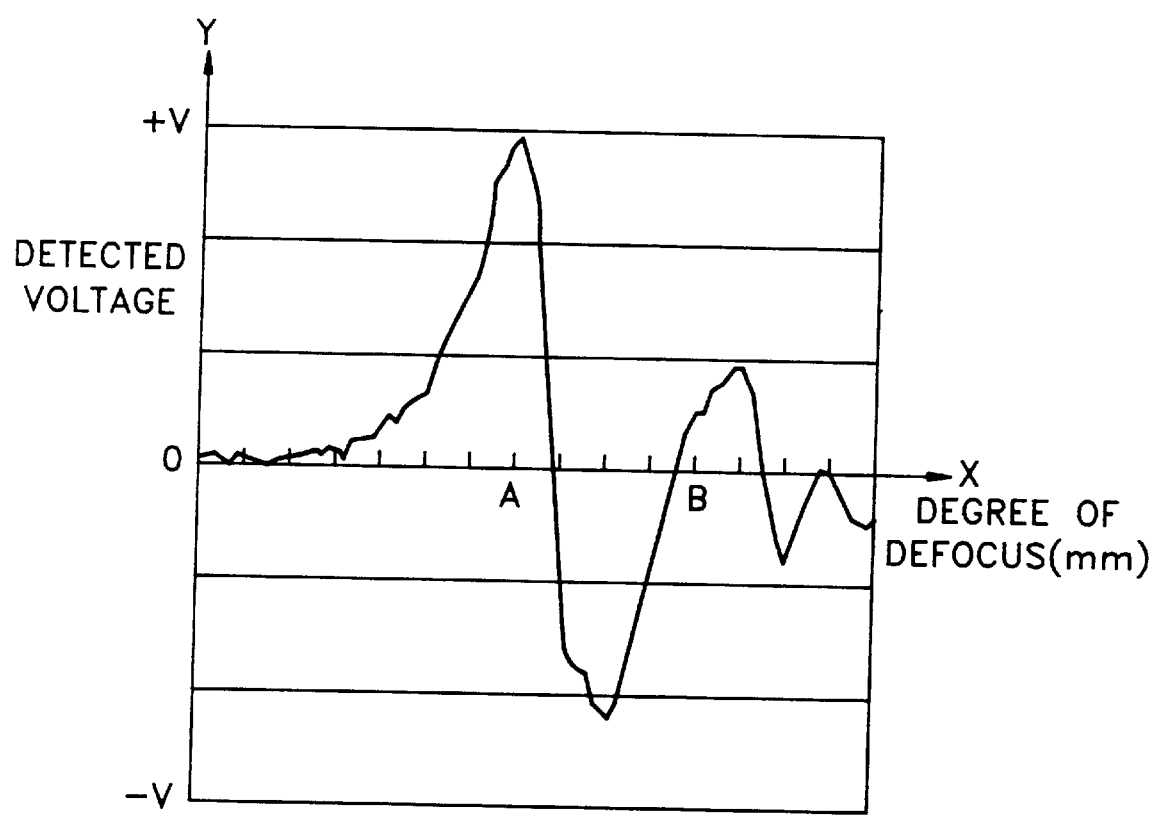
FIG. 5 is a graph showing an initial focus error signal detected by a photodetector of the optical pickups shown in FIGS. 3 and 4 adopting a CD as a recording medium.
Figure 25:
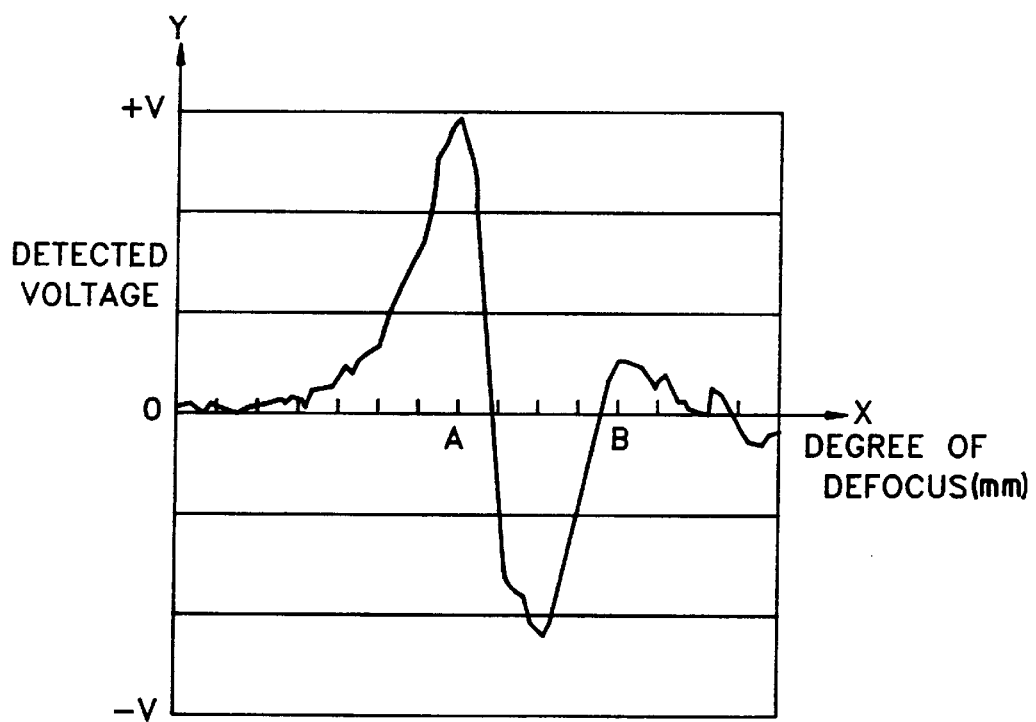
FIG. 25 is a graph showing an initial focus error signal detected by the photodetector of the optical pickup according to the present invention, adopting a CD as a recording medium.

FIG. 25 is a graph showing an initial focus error signal detected by the photodetector of the optical pickup according to the present invention, adopting a CD as a recording medium. The initial focus error signal shown in FIG. 25 will be compared with that of FIG. 5.

According to the objective lens device of the present invention, the light interference caused by the spherical aberration of the light which passes through the far-axis region is suppressed by the second light control surface formed on the transparent member, so that the size of the parasitic waveform B is decreased by about 40%. Thus, the parasitic waveform caused by the mechanical vibration of the optical pickup and the vibration of the recording medium can be prevented.

Figure 26:
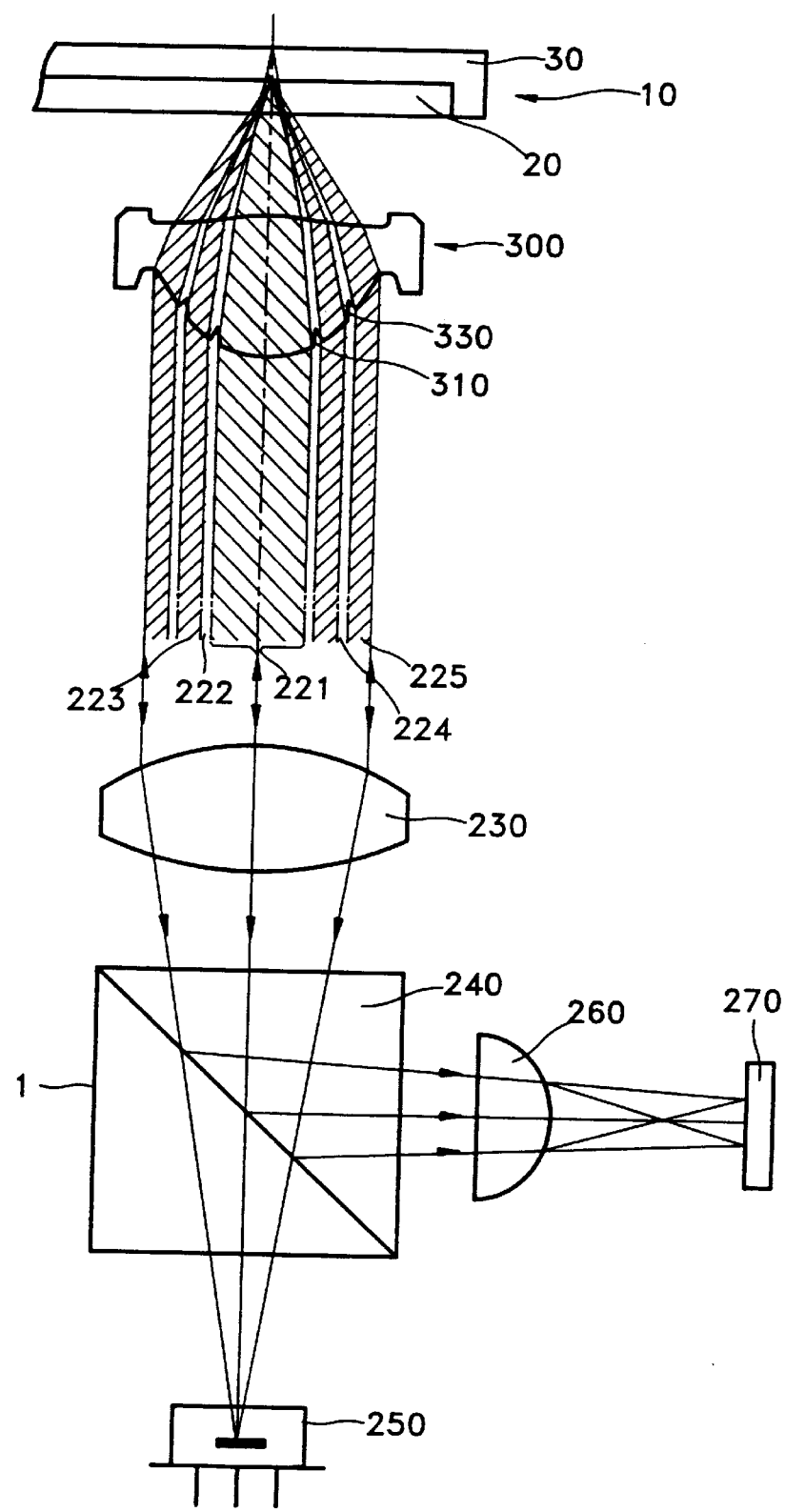
FIG. 26 is a diagram showing the optical arrangement of an optical pickup adopting the objective lens device shown in FIG. 7 according to the present invention.

FIG. 26 is a diagram showing the optical arrangement of an optical pickup adopting the objective lens device, illustrated in FIGS. 7 to 12, according to the present invention.

The optical pickup is basically the same as that illustrated in FIGS. 14 through 24; therefore, elements designated by the same reference numerals as those of FIG. 7 have the same function.

In the above optical pickup, the locations of the first and second light control surfaces with respect to a predetermined numerical aperture can be expressed with a numerical aperture (NA).

That is, if the first and second light control surfaces 310 and 330 are annularly shaped, the NA is defined as NA=n sin θ=n significant diameter/2·focal distance, wherein n is a refractive index. Thus, a disk 20 having a thickness of 0.6 mm±0.15 mm and a refractive index of 1.5±1 and a disk 30 having a thickness of 1.2 mm±0.15 mm and a refractive index of 1.5±1 can both be adopted as a recording medium 10. In order to effectively decrease the size of the parasitic waveform, if an objective lens having a numerical aperture of 0.6 is adopted, it is preferable that the first light control surface 310 is formed at a portion where the inner and outer radii thereof are located at portions corresponding to the numerical apertures of 0.37 and 0.4, respectively, and the second light control surface 330 is formed at a portion where the inner and outer radii thereof locate at portions corresponding to the numerical apertures of 0.44 and 0.46.

Figure 27:
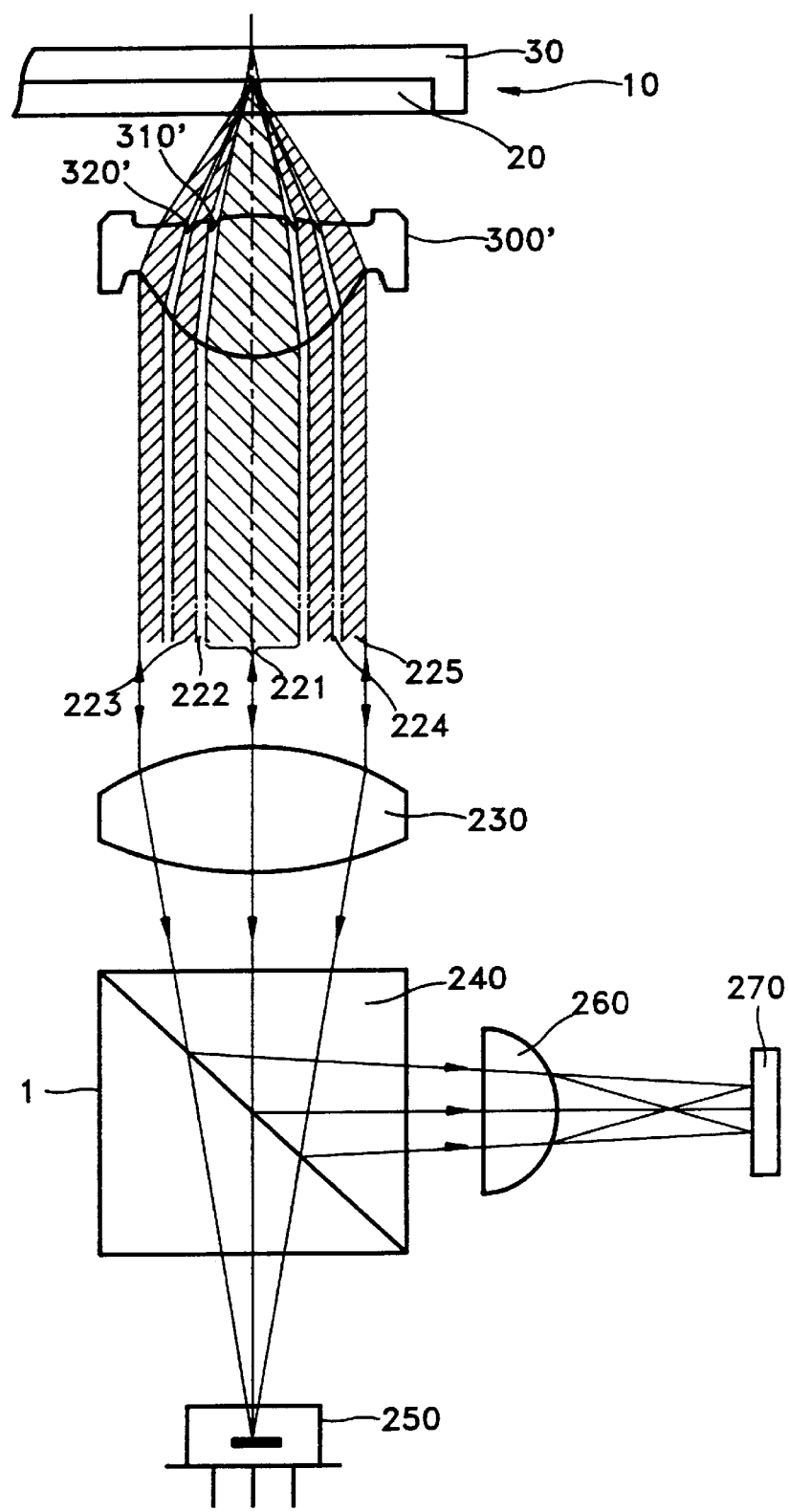
FIG. 27 is a diagram showing the optical arrangement of an optical pickup adopting the objective lens device shown in FIG. 13 according to the present invention.

FIG. 27 is a diagram showing the optical arrangement of an optical pickup adopting the objective lens device shown in FIG. 13 according to the present invention.

The optical pickup is basically the same as the one illustrated with reference to FIGS. 14 to 24.

In FIG. 27, the reference numerals which are the same as those of FIGS. 13 and 14 represent elements having the same function as those of FIGS. 13 and 14.

Also, the objective lens device adopted in the optical pickup according to the present invention may include the first and second light control surfaces 310' and 320' on both surfaces of the objective lens.

In this case, the respective radii of the first and second light control surfaces 310' and 320' formed facing the recording medium 10 are smaller than those formed at the other side.

Thus, the optical pickup according to the present invention has a light control surface at the far axis region as well as at the middle region, so that the light is blocked or scattered thereby, thus sharply reducing the size of the parasitic waveform. As a consequence, an effect of the mechanical vibration can be eliminated when controlling an initial focus position of the optical pickup.

Although the present invention has been described with reference to specific embodiments, further modifications and alterations will occur to those skilled in the art within the scope of the accompanying claims.

What is claimed is:

1. An objective lens device comprising:

an objective lens, arranged at a position along an optical path of a light incident on a recording medium, for converging the incident light to form an optical spot on a recording surface of said recording medium; and a transparent member arranged at a position along the optical path; being separated from said objective lens, and having a first light control portion for blocking at least a portion of the light passing through said objective lens, and a second light control portion for blocking a portion of the light passing through a far axis region of said objective lens, said transparent member transmitting light which is incident on a remaining region thereof other than said first and second light control portions.

2. The objective lens device as claimed in claim 1, wherein said first and second light control portions include a control layer formed on at least one side of said transparent member.

3. The objective lens device as claimed in claim 1, wherein a numerical aperture of said objective lens is 0.6, said first light control portion having an annular shape and being formed such that the inner and outer radii thereof are located at a portion of an incident surface of said objective lens, the portion having a numerical aperture of between 0.37 and 0.4, and said second light control portion having an annular shape and being formed such that the inner and outer radii thereof are located at a further portion of the incident surface of said objective lens, the further portion having a numerical aperture of between 0.44 and 0.46.

4. An objective lens device comprising:

an objective lens, arranged along an optical path of a light which is incident on a recording medium, for converging the incident light to form an optical spot on a recording surface of the recording medium;

a first light control portion formed on at least one side of said objective lens, for one of blocking and scattering one of at least a portion of the light which is incident on a middle region of said objective lens and at least a portion of the light passing through the middle region; and a second light control portion formed on at least one side of said objective lens, for one of blocking and scattering one of at least a portion of the light incident on a far axis region of said objective lens and at least a portion of the light passing through the far axis region.

5. The objective lens device as claimed in claim 4, wherein said first and second light control portions include a control layer formed of a reflective coating on a surface of said objective lens.

6. The objective lens device as claimed in claim 4, wherein said first and second light control portions include a light control pattern formed in a surface of said objective lens to one of scatter and reflect the incident light.

7. The objective lens device as claimed in claim 6, wherein said light control pattern comprises an annular hole.

8. The objective lens device as claimed in claim 7, wherein said light control pattern has a notch configuration.

9. The objective lens device as claimed in claim 7, wherein said light control pattern has one of a protruded staircase shape and a wedge shape.

10. The objective lens device as claimed in claim 4, wherein said first and second light control portions include a toothed portion for one of scattering and deflecting the incident light.

11. The objective lens device as claimed in claim 4, wherein said first and second light control portions include a plurality of fine sawtooth patterns for scattering the incident light, respectively.

12. The objective lens device as claimed in claim 4, wherein a numerical aperture of said objective lens is 0.6, said first light control portion having an annular shape and being formed such that inner and outer radii thereof are located at a portion of an incident surface of said objective lens, the portion having a numerical aperture of between 0.37 and 0.4, and said second light control portion having an annular shape and being formed such that inner and outer radii thereof are located at a further portion of an incident surface of said objective lens, the further portion having a numerical aperture of between 0.44 and 0.46.

13. An optical pickup comprising:

a light source for irradiating a light along an optical path;

optical path converting means for diverting an incident light;

an objective lens, arranged along the optical path between said optical path converting means and a recording medium, for converging the incident light to form an optical spot on said recording medium;

a photodetector for receiving a light which has passed through said objective lens and said optical path converting means after being reflected from the recording medium to detect an error signal and an information signal; and a transparent member arranged along the optical path; being separated from said objective lens, having a first light control portion for blocking at least a portion of the light passing through a middle region of said objective lens, and a second light control portion for blocking part of the light passing through a far axis region of said objective lens, said transparent member transmitting light which is incident on a remaining region thereof other than said first and second light control portions.

14. The optical pickup as claimed in claim 13, wherein said first and second light control portions include a control layer formed on at least one side of said transparent member.

15. The optical pickup as claimed in claim 13, wherein a numerical aperture of said objective lens is 0.6, said first light control portion having an annular shape and being formed such that inner and outer radii thereof are located at a portion of an incident surface of said objective lens, the portion having a numerical aperture of between 0.37 and 0.4, and said second light control portion having an annular shape and being formed such that inner and outer radii thereof are located at a further portion of an incident surface of said objective lens, the further portion having a numerical aperture of between 0.44 and 0.46.

16. The optical pickup as claimed in claim 13, further comprising:
a collimating lens arranged along the optical path between said light source and said objective lens, for collimating the incident light.

17. The optical pickup as claimed in claim 16, further comprising:
an astigmatism lens arranged along an optical path between said optical path converting means and said photodetector.

18. An optical pickup comprising:
a light source for irradiating a light along an optical path;
optical path converting means for diverting an incident light;
an objective lens, arranged along the optical path between said optical path converting means and a recording medium, for converging the incident light to form an optical spot on the recording medium;
a first light control portion formed on at least one side of said objective lens for controlling the light of a middle region of said objective lens;
a second light control portion formed on at least one side of said objective lens for controlling a portion of the light incident on a far axis region of said objective lens; and
a photodetector for receiving a light which has passed through said objective lens and said optical path converting means after being reflected from said recording medium to detect an error signal and an information signal.

19. The optical pickup as claimed in claim 18, wherein said first and second light control portions include a control layer formed of a reflective coating on a surface of said objective lens.

20. The optical pickup as claimed in claim 18, wherein said first and second light control portions include a light control pattern formed in a surface of said objective lens to one of scatter and reflect the incident light.

21. The optical pickup as claimed in claim 20, wherein said light control pattern comprises an annular hole.

22. The optical pickup as claimed in claim 21, wherein said light control pattern has a notch configuration.

23. The optical pickup as claimed in claim 21, wherein said light control pattern has one of a protruded staircase shape and a wedge shape.

24. The optical pickup as claimed in claim 18, wherein said first and second light control portions include a toothed portion for one of scattering and deflecting the incident light.

25. The optical pickup as claimed in claim 18, wherein said first and second light control portions include a plurality of fine sawtooth patterns for scattering the incident light.

26. The optical pickup as claimed in claim 18, wherein a numerical aperture of said objective lens is 0.6, said first light control portion having an annular shape and being formed such that inner and outer radii thereof are located at a portion of an incident surface of said objective lens, the portion having a numerical aperture of between 0.37 and 0.4, and said second light control portion having an annular shape and being formed such that inner and outer radii thereof are located at a further portion of an incident surface of said objective lens, the further portion having a numerical aperture of between 0.44 and 0.46.

27. The optical pickup as claimed in claim 18, further comprising:
a collimating lens arranged along the optical path between said light source and said objective lens, for collimating the incident light.

28. The optical pickup as claimed in claim 27, further comprising:
an astigmatism lens arranged along an optical path between said optical path converting means and said photodetector.

* * * * *